United States Patent Office 3,057,822
Patented Oct. 9, 1962

3,057,822
ORGANO SILICON-TITANIUM COPOLYMERS AND METHOD OF PREPARATION THEREOF
John B. Rust and Hideyo H. Takimoto, Los Angeles, Calif., assignors to Hughes Aircraft Company, Culver City, Calif., a corporation of Delaware
No Drawing. Filed June 30, 1959, Ser. No. 823,816
9 Claims. (Cl. 260—46.5)

The present invention relates to titanoxy modified silicon polymers of enhanced thermal properties, and especially titanium-silicon-oxygen copolymers possessing improved mechanical characteristics at elevated temperatures.

Copolymers of siloxanes and titanium oxides have been described in the art. Although these known copolymers are of considerable interest, their practical value is greatly limited because of inherent brittleness and low mechanical strength characteristics. It is our belief that the limitations of these known polymers are due to the excessively high cross-link density imparted to the polymers by titanium oxide which is indiscriminately used in these known polymers to replace a portion of the substituted siloxane. We have found that this cross-linking tendency can be useful provided that the polymer chain segment flexibility is increased by resorting to proper measures.

Accordingly, it is an important object of this invention to provide resinous compositions possessing an extended range of usefulness at high temperatures.

Another object of this invention is to provide organo silicon-titanium copolymers having satisfactory mechanical properties both at ordinary temperatures and at high temperatures.

A further object of this invention is to provide such resinous compositions wherein the polymer chain segment flexibility is increased to avoid detrimental effects of high cross-linking density in the polymer.

The objects of this invention are obtained by producing organo silicon-titanium copolymers by reacting an alkyl siloxane with an aryl siloxane to produce a resinous product and then reacting this resinous product with a titanium oxide-bearing reactant such as a tetraalkyl titanate, for example, to produce the desired silicon-titanium copolymer. The titanium oxide-bearing reactant preferably is an organic solvent soluble titanium derivative containing a

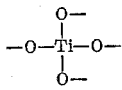

linkage. In another embodiment of this invention, an alkyl siloxane and an aryl siloxane are reacted with a dialkyl siloxane to produce a resinous product which in a subsequent step is reacted with a tetraalkyl titanate to produce the desired organo silicon-titanium copolymer. In this second embodiment, a variation employing an alkyl phenyl siloxane instead of the diaryl siloxane can be used to produce the desired copolymers.

In the paragraph immediately above, the resinous product employed as a reactant with the titanate to produce the polymers of the present invention was described as being obtained by reacting an alkyl siloxane with aryl siloxanes. It will be understood that in actual practice the starting materials generally are not alkyl and aryl siloxanes but instead are alkyl and aryl halogenosilanes, such as chlorosilanes, for example. In practice the chlorosilanes are reacted with an alcohol to produce the corresponding alkoxysilanes and hydrogen chloride. The alkoxysilanes are then hydrolyzed with water to produce silanols, siloxanes and the alcohol. The resulting hydrolysate is heated to split out water and form the resinous polysiloxane products which are employed as a reactant with the titanate to produce the polymers of the present invention. Alternately, the starting materials can be alkoxysilanes instead of the halogenosilanes. It is preferable to define the resinous polysiloxane products in terms of siloxane reactants because such definitions give a clearer insight into the structure of the polysiloxane intermediate products and the final organo silicon-titanium copolymers of this invention.

The reactions discussed above can be illustrated as follows:

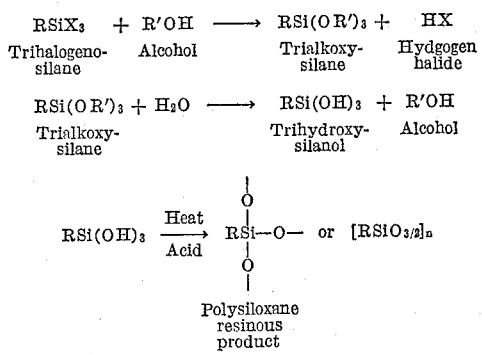

The polysiloxane resinous product is, of course, reacted with a tetraalkyl titanate to produce the desired silicon-titanium copolymers of this invention.

The organo groups or radicals in the halogenosilane or alkoxysilane starting materials, indicated by the radical R in the reactions illustrated above, may be any suitable alkyl or aralkyl group or mixtures of compounds having such groups. In general, when the number of carbon atoms per radical is higher than about 6 to 12, the thermal stability of the resulting silicon-titanium copolymer tends to decrease, so that compounds having alkyl and aralkyl radicals containing the lower numbers of carbon atoms per radical are generally preferred.

Similarly, the aryl group or radical in the aryl siloxane or diaryl siloxane reactant, or in the corresponding aryl- or diaryl halogenosilane or aryl- or diarylalkoxysilane starting materials used to produce the resinous polysiloxane can be an aryl group with one or more aromatic ring structures and can be an alkaryl radical, or a perhalogenated aryl or alkaryl radical as well as such mixed reactant compounds with aryl and alkaryl radicals. In general, however, the number of aromatic rings per aryl or alkaryl radical-containing reactant preferably is not greater than about 2 or 3 because the thermal stability of the resulting silicon-titanium copolymers tends to decrease if the radical contains larger numbers of aromatic rings.

In an analogous manner, the tetraalkyl titanate, $Ti(OR'')_4$, can contain any suitable alkyl or aralkyl radical which may be methyl, ethyl, propyl, butyl, isopropyl, sec. butyl, etc., or benzyl, methyl benzyl, $\alpha$-phenylethyl, $\beta$-phenyl ethyl, $\alpha$-phenyl propyl, etc. and mixed titanates having such alkyl and aralkyl radicals. However, as pointed out above in discussing the siloxane reactants, the number of carbon atoms per alkyl radical preferably should not be higher than about 6 to 12 and the number of aromatic rings per aralkyl radical preferably should not be greater than about 2 or 3 because the thermal stability of the silicon-titanium polymer may suffer. Furthermore, it is not essential that the titanium reactant be a tetraalkyl titanate. Any suitable soluble titanium derivative may be used in the place of the titanium ester. Examples of such suitable titanium derivatives are octylene glycol titanate, triethanolamine titanate, triethanolamine titanate-n-oleate, titanium lactate, isopropoxy titanium oleate, and the like.

It is believed that the silicon-titanium copolymers of this invention owe their enhanced thermal properties to (a) the high bond energy of the Ti—O—Si system, (b) increased cross-linked density afforded by

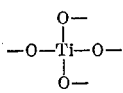

and (c) interruption of the —Si—O—Si—O— polymer chain by —Ti—O— thus minimizing the tendency to cyclicize. Brittleness is obviated and the mechanical strength increased by careful selection of the ingredients of the copolymers and the proportions of the ingredients to effect an increase in polymer chain segment flexibility.

A comparison of the improved properties of the copolymers of this invention with those of the prior art may be made as follows. In the prior art, a siloxane resin is formed by reacting 70 mole percent of methyl siloxane and 30 mole percent of phenyl siloxane to produce a resinous copolymer. This prior art resin exhibits acceptable mechanical properties at ordinary temperatures when suitably cured, but these properties rapidly deteriorate with increasing elevated temperatures. If 10 mole percent of titanium oxide is reacted in the form of tetraisopropyl titanate with the methyl siloxane and the phenyl siloxane reactants in the above example, the resulting resinous copolymer, after being cured, exhibits poor room temperature mechanical properties and is illustrative of titanium-silicon copolymers which are embrittled by the increased cross-link produced by the incorporation of the titanate with the siloxane reactants.

On the other hand, a titanoxy siloxane resin produced in accordance with the method of the present invention results when about 60 mole percent of methyl siloxane and about 30 mole percent of phenyl siloxane are reacted with about 10 mole percent of diphenyl siloxane and the resulting resinous polysiloxane, produced by this reaction, is in turn reacted with about 4 mole percent of titanium oxide in the form of tetraisopropyl titanate. When the resulting silicon-titanium copolymer is properly cured, it exhibits good room temperature mechanical properties which are retained without substantial deterioration even at greatly elevated temperatures. In a modification of the above method, diphenyldihydroxysilane can be reacted with an equimolar quantity of tetraisopropyl titanate. This material then can be combined with the polysiloxane resin to give copolymers exhibiting exceptional thermal stability. To complete the illustration, it should be pointed out that when the titanium oxide in the form of tetraalkyl titanate is omitted from the above-described resin produced by reacting methyl siloxane, phenyl siloxane and diphenyl siloxane, a polymer is produced which, when cured, exhibits relatively poor mechanical properties at elevated temperatures.

Although the mechanical properties of the compositions of this invention are excellent at room temperature, their great utility is manifested by their pronounced mechanical properties, including enhanced mechanical strength at greatly elevated temperatures. Thus at 316° C. their flexural strength may be as great as twice or more times the value of the better known siloxane resins that may be obtained commercially. The compositions of the present invention are of practical value both as high and low pressure laminating resins, molding resins, insulating varnishes and protective coatings. In addition, the silicon-titanium copolymers of this invention exhibit enhanced affinity as filling materials of certain types which may be utilized with glass fibers, titanium dioxide fillers and titanate fillers to produce articles with good mechanical properties at elevated temperatures.

The following examples are given to illustrate the materials and method of the present invention and are not to be construed as limiting the spirit or scope of the invention.

*Example 1*

To a mixture of 194.4 g. (1.30 moles) of methyltrichlorosilane, 148.0 grams (0.70 mole) of phenyltrichlorosilane and 25.2 g. (0.10 mole) of diphenyldichlorosilane dissolved in 600 ml. of toluene was added slowly 520 ml. of n-propyl alcohol to produce the corresponding alkoxysilanes and hydrogen chloride. The hydrogen chloride formed in the reaction was partially removed by refluxing for five hours. The yellow solution of the mixed alkoxysilanes was then cooled in an ice bath and cautiously neutralized with 350 ml. of saturated sodium bicarbonate solution. The contents of the flask were heated for three hours and the layers separated. The partially hydrolyzed silicone solution was then refluxed with 360 ml. of 4 N-sulfuric acid to complete the hydrolysis and to further advance the resin (resin A). The organic layer was again separated, washed with water until neutral to litmus and dried over anhydrous magnesium sulfate. By means of an air stream a partial removal of the solvent was effected until the solution was 60 percent solids.

To 100 g. of the above resin in the form of 60 percent by weight solution in toluene were added 10 grams of tetraisopropyl titanate and 10 grams of diphenyldihydroxysilane. The diphenyldihydroxysilane is added to interact with the tetrafunctional titanate and the resin to reduce the number of cross-link points so that the cross-link density in the copolymer product is maintained at a desirable level. In this manner brittleness of the resulting silicon-titanium copolymer is avoided and its mechanical strength characteristics are increased. In some cases tetrahydrofuran was added to obtain a homogeneous solution. The addition of the titanium ester caused the yellow resin solution to turn yellow-orange in color. The resin (resin B) was catalyzed with trimethyl (beta-hydroxyethyl) ammonium 2-ethyl hexoate, lead- and zirconium naphthenates. The resin was dip impregnated onto a commercial heat-cleaned glass cloth designated as ECC–181 and a six-ply laminate was formed by pressing six layers of the impregnated glass cloth in a press at 250 p.s.i. and heating simultaneously at 175° C. for 45 minutes. The clear, yellow, translucent laminate was removed from the press and postcured as follows: 18 hours at 135° C., 18 hours from 135–260° C. and 48 hours at 260° C. The flexural strength of this material was 49,900 p.s.i. at room temperature, 22,100 p.s.i. at 316° C., 19,200 p.s.i. at 427° C. and 17,800 p.s.i. at 538° C.

A six-ply laminate was prepared directly from Resin A, which is representative of a typical, commercially available silicone resin. No tetraisopropyl titanate or additional diphenyldihydroxysilane was added. This laminate when postcured as described above gave flexural strengths of 44,200 p.s.i. at room temperature, 12,700 p.s.i. at 371° C., and 11,500 p.s.i. at 538° C.

*Example 2*

To 100 grams of a toluene solution of resin B, prepared as in Example 1 and catalyzed in a like manner, were added 120 grams of strontium titanate. A six-ply laminate of glass cloth was made using the procedure also described in Example 1. This light grey laminate after 48 hours postcure at 260° C. was found to have the following flexural strengths: 33,400 p.s.i. at room temperature, 22,200 p.s.i. at 316° C., 19,100 p.s.i. at 427° C. and 20,300 p.s.i. at 538° C.

A six-ply laminate was prepared from Resin A in Example 1 using strontium titanate as a filler. No tetraisopropyl titanate or additional diphenyldihydroxysilane was added. This laminate when postcured as described above gave flexural strengths of 34,800 p.s.i. at room temperature, 9,300 p.s.i. at 371° C. and 19,600 p.s.i. at 538° C.

*Example 3*

Following the procedure of Example 1 for the preparation of resin A, a resin polymer having the composition of 70 mole percent methyl siloxane, 25 mole percent phenyl siloxane and 5 mole percent diphenyl siloxane was prepared. To 100 grams of this resin (in the form of 60 percent by weight in toluene) were added 5 grams of tetraisopropyl titanate and 5 grams of diphenyldihydroxysilane. After catalysis, a six-ply translucent glass-reinforced laminate was made as described in Example 1. After 48 hours of aging at 260° C., this laminate was found to have a room temperature flexural strength of 41,100 p.s.i. and at 316° C. of 21,700 p.s.i.

*Example 4*

A polymer having a composition of 65 mole percent methyl siloxane and 35 mole percent phenyl siloxane was prepared utilizing the procedure of Example 1 for the preparation of resin A. To 100 grams of this resin was added 10 grams of tetraisopropyl titanate. The laminate prepared from this resin solution had the following flexural strength after aging for 48 hours at 316° C.: 41,300 p.s.i. at room temperature and 19,500 p.s.i. at 316° C.

*Example 5*

To 10 grams of diphenyldihydroxysilane dissolved in a mixture of toluene and tetrahydrofuran, 10 grams of tetraisopropyl titanate was added. The solution turned yellow and then to yellow-orange in color upon the addition of the tetraalkyl titanate. This material was combined with 100 grams of a toluene solution of Resin A prepared as in Example 1. The copolymer solution, upon being catalyzed, can be used for the preparation of laminates. A sample of this solution heated to 200° C. resulted in a formation of a clear, tough film.

The polymerizable compositions of this invention are initially soluble in aromatic solvents or mixtures of aromatic solvents with aliphatic alcohols, or esters. For instance, excellent usable solutions may be made in toluene. These solutions may be used as impregnating varnishes, as coating varnishes for laminates or as varnishes from which molding compositions may be formed. In the case of laminates, a glass-fiber cloth which has been heat cleaned or which has been treated with an appropriate finish such as Volan A, a methacrylato chromic chloride, or a silane finish such as Owens-Corning OC-136 or Bakelite A-1100, or the like, is dip impregnated with the varnish, dried at a low temperature and precured, if desired, at an elevated temperature to reduce resin flow. The impregnated cloth is then shaped under heat and pressure. Prior to impregnation an appropriate catalyst may be added to the resin varnish. Such catalysts may be metal salts of carboxylic acids, quaternary ammonium salts of carboxylic acids, metal oxides, amines, organic peroxides, and the like. As a varnish, the resin solution may be used as such with or without catalysts and applied by spraying, brushing or dipping. For molding compositions, the resin should preferably be dissolved in a low boiling solvent as, for instance, benzene, ethyl acetate, isopropanol, and the like, and mixed with appropriate fillers, reinforcing agents, fibrous materials, catalysts, etc., the solvent driven off at low temperatures and the dried mixture treated further in mixers, calendering rolls, differential rolls, ball mills, etc.

As pointed out above, the organic silicon-titanium copolymers of the present invention are prepared by reacting materials exemplified by methyl siloxane, $CH_3SiO_{3/2}$, phenyl siloxane, $C_6H_5SiO_{3/2}$, diphenyl siloxane $$(C_6H_5)_2SiO$$

and titanium oxide 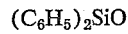. Of these constituents three, namely, methyl siloxane, phenyl siloxane and titanium oxide contribute to the cross-linking of the cured composition, one, diphenyl siloxane, to the extension of chain segments between cross links, and all to the chain segment flexibility. With special regard to chain segment flexibility, which bears a strong relationship to toughness or brittleness of the compositions, the phenyl substituted siloxanes and titanium oxide play the largest role in lowering mechanical strength properties, as well as playing the largest role in increasing thermal stability. We have discovered that by properly selecting the proportions of these constituents enhanced mechanical properties at elevated temperature may be achieved without deleteriously affecting the room temperature mechanical properties. In order to establish suitable criteria for an evaluation of enhanced performance, flexural strength has been selected as representative of a mechanical strength property. A flexural strength of 35,000 p.s.i. at room temperature is considered necessary for a satisfactory laminate and a flexural strength of 19,000 p.s.i. at 316° C. is considered the minimum indicative of enhanced thermal stability. All laminates whose flexural strength falls below these figures are considered unacceptable and those at or above these figures are considered satisfactory.

We have found that by making flexural strength measurements on compositions consisting of the constituents specified above, the organo silicon-titanium compositions of this invention fall in the range containing from 80 to 50 moles of alkyl siloxane, from 25 to 50 moles of aryl siloxane, from 4 to 20 moles of diaryl-, alkyl aryl-, or mixtures of alkyl and aryl siloxanes, and from 2 to 10 moles of titanium oxide as an organic compound such as a titanium ester, respectively. In the present invention we have found that the weight ratio of titanium oxide ($y$) to diphenyl siloxane ($x$) in the titanium oxide containing composition which is added to the silicone resin prepolymer, should remain substantially constant at $x/y=3$, although it may be varied slightly from about 2 to about 4 without substantially affecting either the results achieved with the compositions of this invention or the range of acceptable flexural strength.

What is claimed is:

1. A method of producing an organosilicon-titanium oxide polymer comprising reacting a silicone resin, prepared in a molecular proportion so as to comprise from 80 to 50 moles of alkylsiloxane having the general formula $RSiO_{3/2}$ where R is an alkyl radical selected from the group consisting of methyl, ethyl, propyl, butyl, amyl and hexyl radicals, from 25 to 50 moles of arylsiloxane having the general formula $R'SiO_{3/2}$, and from 4 to 20 moles of diarylsiloxane having the general formula $R''_2SiO$ where R' and R'' are aryl radicals selected from the group consisting of phenyl, tolyl, xylyl and biphenyl radicals, with from 2 to 10 moles of tetraalkyl titanate having the general formula $(R'''O)_4Ti$ where R''' is an alkyl radical selected from the group consisting of methyl, ethyl, propyl, butyl, amyl and hexyl radicals, said tetraalkyl titanate being in admixture with that amount of said diarylsiloxane so the weight ratio of diarylsilxaone to titanium oxide contained in said tetraalkyl titanate is from 2 to 4.

2. A composition of matter comprising a silicone polymer consisting in molecular proportion of from 80 to 50 moles of alkylsiloxane having the general formula $RSiO_{3/2}$, from 25 to 50 moles of arylsiloxane having the general formula $R'SiO_{3/2}$, from 4 to 20 moles of diarylsiloxane having the general formula $R''_2SiO$ and from 2 to 10 moles of tetraalkyl titanate having the general formula $(R'''O)_4Ti$ where R and R''' are alkyl radicals selected from the group consisting of methyl, ethyl, propyl, butyl, amyl and hexyl radicals and R' and R'' are aryl radicals selected from the group consisting of phenyl, tolyl, xylyl and biphenyl radicals, said tetraalkyl titanate being reacted into said composition in admixture with that amount of said diarylsiloxane so that the weight ratio of diaryl siloxane to the titanium oxide contained in said tetraalkyl titanate is from 2 to 4.

3. A method according to claim 1 wherein R is the methyl radical, R' and R'' are the phenyl radical and R''' is the isopropyl radical.

4. A composition of matter according to claim 2 wherein R is the methyl radical, R' and R'' are the phenyl radical and R''' is the isopropyl radical.

5. A method of producing an organosilicon-titanium oxide polymer comprising reacting a silicone resin, prepared in a molecular proportion so as to comprise from 80 to 50 moles of methylsiloxane, from 25 to 50 moles of phenylsiloxane, and from 4 to 20 moles of diphenylsiloxane, with from 2 to 10 moles of tetraisopropyl titanate, said tetraisopropyl titanate being in admixture with that amount of said diphenylsiloxane so the weight ratio of diphenylsiloxane to titanium oxide contained in said tetraispropyl titanate is from 2 to 4.

6. A composition of matter comprising, in molecular proportion, a silicone resin consisting of from 80 to 50 moles of methylsiloxane, from 25 to 50 moles of phenylsiloxane, from 4 to 20 moles of diphenylsiloxane and from 2 to 10 moles of tetraisopropyl titanate, said tetraisopropyl titanate being reacted into said composition in admixture with that amount of said diphenylsiloxane so the weight ratio of diphenylsiloxane to titanium oxide contained in said tetraisopropyl titanate is from 2 to 4.

7. A method of producing an organosilicon-titanium oxide laminating varnish composition comprising reacting a solution of a silicone resin, prepared in molecular proportion so as to comprise from 80 to 50 moles of methyl siloxane, from 25 to 50 moles of phenylsiloxane and from 4 to 20 moles of diphenylsiloxane, with from 2 to 10 moles of tetraisopropyl titanate, said tetraisopropyl titanate being in admixture with that amount of said diphenylsiloxane so the weight ratio of said diphenylsiloxane to titanium oxide contained in said tetraisopropyl titanate is from 2 to 4.

8. A method of producing an organosilicon-titanium oxide laminating varnish comprising reacting a solution of a silicone resin, being prepared in molecular proportion so as to comprise 65 moles of methylsiloxane, 35 moles of phenylsiloxane and 5 moles of diphenylsiloxane, with a mixture of 3.5 moles of tetraisopropyl titanate and 4.5 moles of diphenyl dihydroxylsilane, the weight ratio of diphenylsilane contained in said diphenyl dihydroxysilane to titanium oxide contained in said tetraisopropyl titanate being 3.2.

9. A method of producing an organosilicon-titanium oxide laminating varnish comprising reacting a solution of a silicone resin, prepared in molecular proportion so as to comprise 70 moles of methylsiloxane, 25 moles of phenylsiloxane and 5 moles of diphenylsiloxane, with a mixture of 1.57 moles of tetraisopropyl titanate and 2.06 moles of diphenyl dihydroxy silane, the weight ratio of diphenylsiloxane contained in said diphenyl dihydroxysilane to titanium oxide contained in said tetraisopropyl titanate being 3.25.

References Cited in the file of this patent

UNITED STATES PATENTS

| | | |
|---|---|---|
| 2,518,160 | Mathes | Aug. 8, 1950 |
| 2,672,455 | Currie | Mar. 16, 1954 |
| 2,680,723 | Kronstein | June 8, 1954 |
| 2,901,460 | Boldebuck | Aug. 25, 1959 |
| 2,908,593 | Neidus | Oct. 13, 1959 |
| 2,928,798 | Brown et al. | Mar. 15, 1960 |
| 2,928,799 | Brown | Mar. 15, 1960 |

OTHER REFERENCES

Chemistry of Silicone (Rochow), published by John Wiley & Sons, 1951, page 56 relied on.